G. BASSETT.
Ornamental Glass Panel.
No. 197,240.　　　　　Patented Nov. 20, 1877.
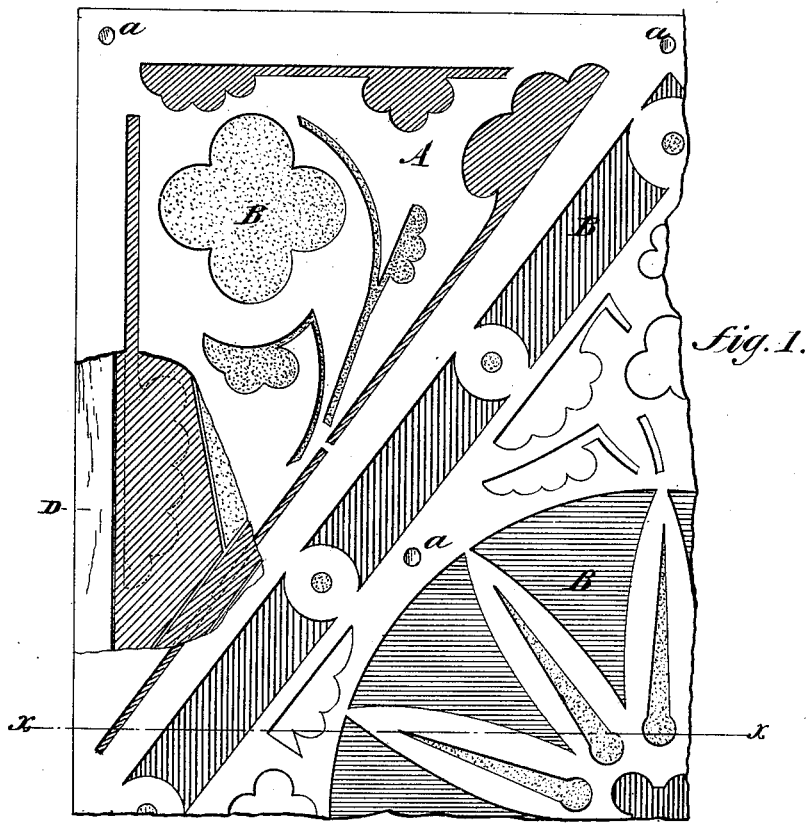
Fig. 1.
Fig. 2.
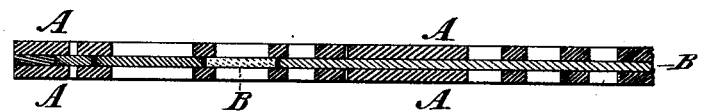
WITNESSES:
Gustave Dieterich
J. H. Scarborough
INVENTOR:
G. Bassett
BY
ATTORNEYS.

UNITED STATES PATENT OFFICE.

GEORGE BASSETT, OF CHICAGO, ILLINOIS.

IMPROVEMENT IN ORNAMENTAL GLASS PANELS.

Specification forming part of Letters Patent No. 197,240, dated November 20, 1877; application filed August 11, 1877.

*To all whom it may concern:*

Be it known that I, GEORGE BASSETT, of Chicago, in the county of Cook and State of Illinois, have invented a new and Improved Glass Panel, of which the following is a specification:

In the accompanying drawings, Figure 1 represents a top view, and Fig. 2 a vertical transverse section on line $x\,x$, Fig. 1, of my improved ornamental glass panel.

Similar letters of reference indicate corresponding parts.

The object of this invention is to arrange glass in such a manner that it can be used for many purposes of domestic nature in effective and ornamental manner, being applicable for vertical or sliding doors, for windows, transparencies, show-cards, emblems, fire-screens, panels for doors, shutters, or transom-lights, and other purposes. The ornamental glass panel may be readily screwed, nailed, or otherwise fitted to its place, and furnishes, with suitably-colored glass, unique, yet cheap, designs of great variety.

The invention consists of pieces of plain, ground, or colored glass interposed between face layers of ornamentally cut-out wood, or card-board, or any suitable substance, which is cemented thereto and connected by wooden pins, the glass being surrounded by an intermediate border layer of wood, to be readily nailed or otherwise attached.

In the drawing, A represents the outer protective layers or facings, of wood, pasteboard, or other material, said facings being cut out, perforated, or sawed with a scroll-saw in any desired design, a number of them being cut out at the same time, and polished or otherwise finished before being placed on the glass. A layer, B, of plain, ground, or colored glass is formed of a number of smaller pieces, that correspond in their general outlines to the designs cut into the face layers, and then cemented into place on one of the face layers, and the joints filled in with cement, so that the layer of glass cannot move. Then the other face layer is cemented on, and the three layers are then allowed to dry by being placed between soft material into a press, and exposed to light pressure until they become one strong and solid piece, without the use of lead, putty, or other substance to connect the glass. The face layers are further connected by small pins or pegs a, which are passed at suitable distances through the same. The glass layer is surrounded by an intermediate border or frame, D, of wood, of equal thickness with the glass layer, to admit the convenient nailing or screwing on of the glass panel, or the cutting into the shape or pattern required.

The designs and colors of the panel can be made to match the furniture, so as to bring the windows, fire-screens, doors, &c., in pleasing and attractive harmony with the entire fitting up of the room.

The ornamental panels of this kind are of comparatively cheap construction, and are strong and durable, as the glass is sustained between two layers of wood, so as to be protected effectively against breakage. They form a new article of manufacture, and may be employed for ornamental purposes, domestic and public use.

Having thus described my invention, I claim as new and desire to secure by Letters Patent—

The ornamental panel herein described, consisting of two face layers of a rigid material, having designs or ornamental figures cut therein, and an intermediate layer of glass plates separated from each other, and retained in position by cement, as and for the purpose set forth.

GEORGE BASSETT.

Witnesses:
 JOHN P. FREES,
 JOHN FEULNER.